(12) United States Patent
Akabe et al.

(10) Patent No.: US 12,154,363 B2
(45) Date of Patent: Nov. 26, 2024

(54) DOCUMENT DISPLAY ASSISTANCE SYSTEM, DOCUMENT DISPLAY ASSISTANCE METHOD, AND PROGRAM FOR EXECUTING SAID METHOD

(71) Applicant: Xcoo, Inc., Tokyo (JP)

(72) Inventors: Koichi Akabe, Tokyo (JP); Toshiki Takeuchi, Tokyo (JP); Takashi Aoki, Tokyo (JP); Kunihiro Nishimura, Tokyo (JP)

(73) Assignee: Xcoo, Inc., Tokyo (JP)

( * ) Notice: Subject to any disclaimer, the term of this patent is extended or adjusted under 35 U.S.C. 154(b) by 141 days.

(21) Appl. No.: 17/758,196

(22) PCT Filed: Dec. 18, 2020

(86) PCT No.: PCT/JP2020/047568
§ 371 (c)(1),
(2) Date: Jun. 29, 2022

(87) PCT Pub. No.: WO2021/145146
PCT Pub. Date: Jul. 22, 2021

(65) Prior Publication Data
US 2022/0375246 A1 Nov. 24, 2022

(30) Foreign Application Priority Data
Jan. 16, 2020 (JP) ................. 2020-005523

(51) Int. Cl.
*G06F 17/00* (2019.01)
*G06F 16/31* (2019.01)
(Continued)

(52) U.S. Cl.
CPC .......... *G06V 30/414* (2022.01); *G06F 16/313* (2019.01); *G06F 16/93* (2019.01); *G06F 40/169* (2020.01)

(58) Field of Classification Search
CPC .... G06V 30/414; G06V 30/41; G06F 16/313; G06F 16/93; G06F 40/169; G06F 40/106; G06F 40/30; G06F 40/216; G06F 40/295
See application file for complete search history.

(56) References Cited

U.S. PATENT DOCUMENTS

2003/0221163 A1* 11/2003 Glover ................. G06F 16/951
707/E17.09
2020/0073996 A1* 3/2020 Wright .................. G06N 20/00
(Continued)

FOREIGN PATENT DOCUMENTS

JP 2012-141797 A 7/2012
JP 2016-207071 A 12/2016

OTHER PUBLICATIONS

Dong, Yanru, et al. "A fusion model-based label embedding and self-interaction attention for text classification." IEEE Access 8 (2019): 30548-30559 (Year: 2019).*
(Continued)

*Primary Examiner* — Andrew T McIntosh
(74) *Attorney, Agent, or Firm* — Studebaker & Brackett PC

(57) ABSTRACT

The present invention provides a document display assistance system which estimates and highlights significant words in a document of a specific field. The system comprises: a database in which selection-target words and non-selection-target words are registered; a learned word-selection model having been applied with machine learning for estimating whether a word is a selection-target word; a text pre-processing unit which segments words from an accepted display-target document; a word classification unit which classifies, based on the database, the word into any of a selection-target word, a non-selection-target word, and an indeterminate word; a text post-processing unit which generates output data by imparting a predetermined attribute to
(Continued)

a predetermined word in the display-target document; and an output unit which outputs the output data. If a label is estimated indicating that the indeterminate word classified by the word classification unit is a selection-target word, the word selection model classifies the indeterminate word into a selection-target word and the text post-processing unit imparts the predetermined attribute to the classified selection-target word.

17 Claims, 12 Drawing Sheets

(51) Int. Cl.
*G06F 16/93* (2019.01)
*G06F 40/169* (2020.01)
*G06V 30/414* (2022.01)

(56) References Cited

U.S. PATENT DOCUMENTS

| | | | |
|---|---|---|---|
| 2020/0143257 A1* | 5/2020 | Neelamana | G06F 16/248 |
| 2020/0151260 A1* | 5/2020 | Hätty | G06N 3/044 |
| 2020/0175397 A1* | 6/2020 | Wang | G06F 16/285 |
| 2020/0311344 A1* | 10/2020 | Tripathi | G06F 16/24575 |
| 2021/0158210 A1* | 5/2021 | Kalluri | G06F 16/3347 |
| 2021/0200951 A1* | 7/2021 | Gao | G06F 40/242 |

OTHER PUBLICATIONS

International Search Report issued in PCT/JP2020/047568; mailed Feb. 16, 2021.

* cited by examiner

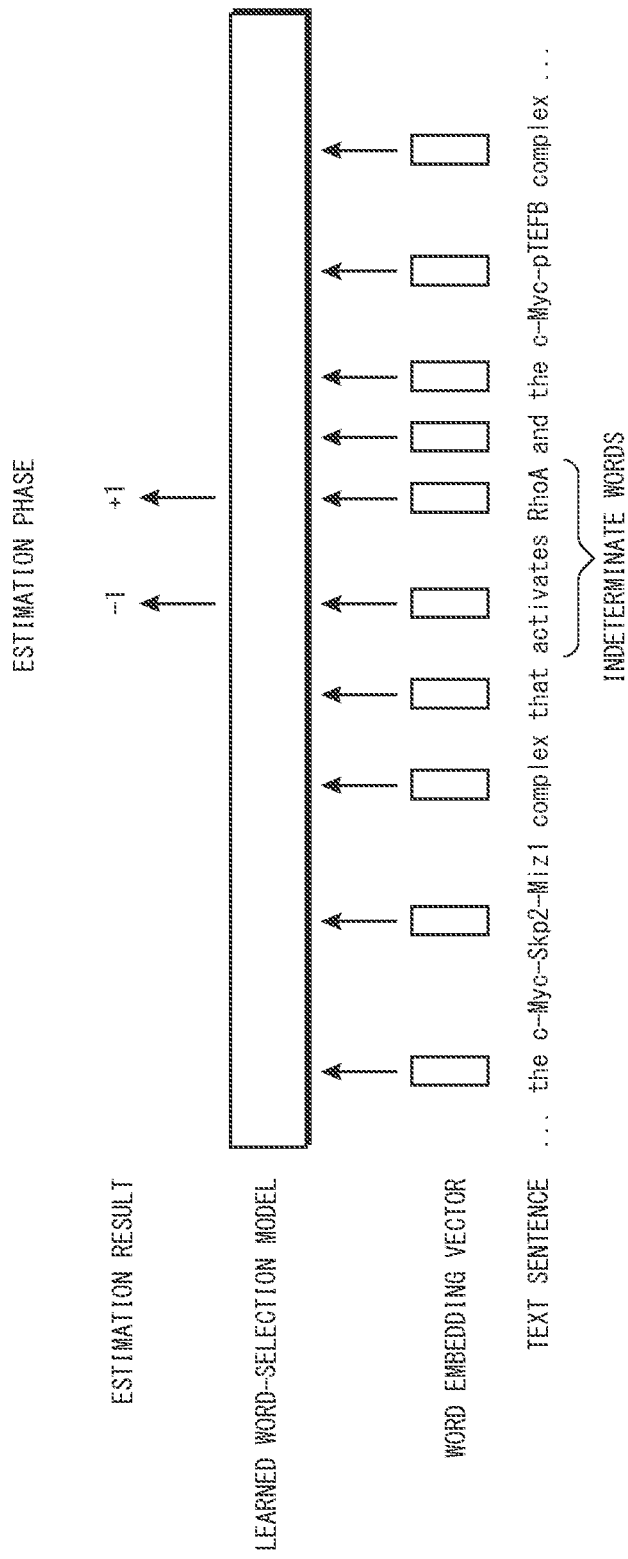

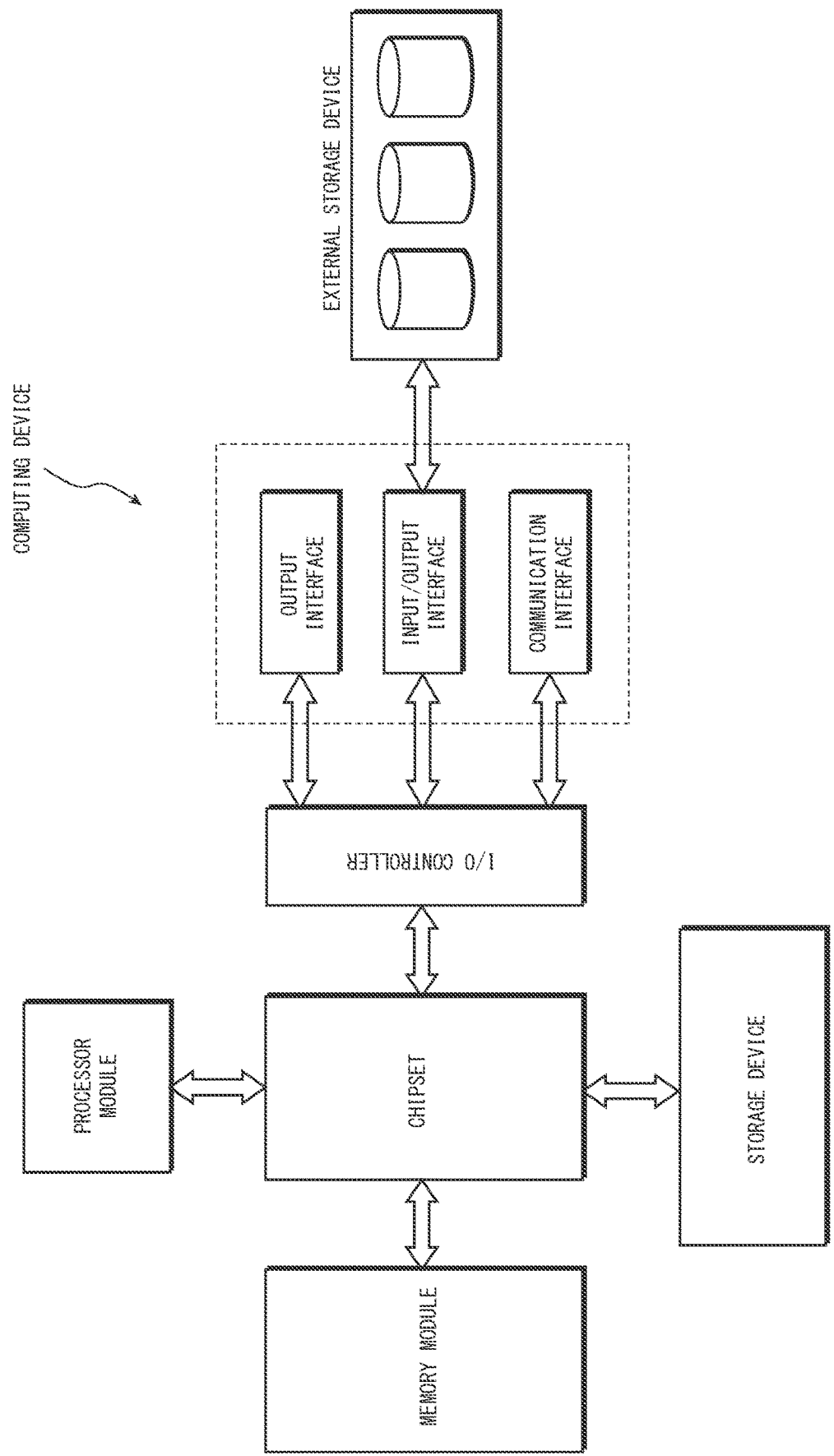

DOCUMENT DISPLAY ASSISTANCE SYSTEM, DOCUMENT DISPLAY ASSISTANCE METHOD, AND PROGRAM FOR EXECUTING SAID METHOD

TECHNICAL FIELD

The present invention relates to document display assistance technology, in particular to a document display assistance system and a document display assistance method for displaying specific words in a document in a specific field by visually differentiating such words, as well as to a program for executing such a method.

BACKGROUND ART

There is a vast number of documents stored in databases around the world today. Typically, users must read a document and understand its content in order to determine whether such document is related to a specific field and is significant. For example, in the field of cancer genomic medicine, health-care professionals, such as doctors and researchers, perform annotation in order to create reports on gene mutations obtained through information analysis, while referring to knowledge databases and integrated databases in which information on gene mutations, drugs, clinical trials, and the like, are accumulated. Among such information, information related to gene mutations and clinical significance is mostly published in the form of a paper, and health-care professionals are required to read the sentences of difficult papers and to correctly comprehend the same.

However, the number of papers that must be referenced is vast, the content of the respective papers is difficult, and the number of contents is also very large. Therefore, the reality is that it is difficult to quickly determine whether the paper of interest is useful in cancer genomic medicine, and which part of the paper contains significant information. For this reason, several techniques have been proposed in order to find ways to display documents to which users seek to refer.

For example, Patent Document 1 below discloses a technique for checking only the sentences that the user wants to check in patent information data including long sentences. In particular, Patent Document 1 discloses an information processing apparatus in which processing means includes a content determination character searching part, a highlight display processing part, a sentence separation determination part, a display determination part, and a non-display setting part, and in which display means displays, for each piece of patent data, sentences determined by the display determination part to include highlighted characters and separated according to paragraph signs, and displays the highlighted characters that are colored by the highlight display processing part.

In addition, Patent Document 2 below discloses a technique for automatically searching a highly relevant medical report from among the past medical reports by using, as a keyword, a word or a word string weighted on the basis of occurrence frequency and significance relating to a case for automatically searching a relevant case report from among the text of the past medical reports, including inspection purpose columns, opinion columns, and diagnosis columns.

PRIOR ART DOCUMENTS

Patent Documents

Patent Document 1: Japanese Patent Publication No. 2016-207071

Patent Document 2: Japanese Patent Publication No. 2012-141797

SUMMARY OF THE INVENTION

Problems to be Solved by the Invention

However, with the technique disclosed in Patent Document 1 above, there is a problem to the effect that the user must enter, point by point, content determination characters from the input means, while the user thinks of such characters that the user wants to highlight, and it is therefore time consuming and cumbersome. In addition, the highlighted characters are the user's subjective characters and do not necessarily accurately indicate that such highlighted characters are significant or relevant in a specific field.

Moreover, in the technique disclosed in Patent Document 2 above, a word or a word string, which doctors and the like, think is important in the displayed report, needs to be pre-selected and added to a significance keyword list in order to use, as a search keyword, a word or a word string weighted on the basis of occurrence frequency and significance. Therefore, as with the above description, such word or word string does not necessarily accurately indicate that such word or word string is significant or relevant in a specific field.

As such, an object of the present invention is to provide document display assistance technology by means of which words that are deemed significant or relevant in a specific field can be estimated in a document of such specific field to which a user seeks to refer, and such estimated words can be displayed in a visually differentiated manner.

Means for Solving the Problems

The present invention for solving the above-described problems is configured to include the matters specifying the invention or technical features indicated below.

The present invention according to an aspect is a document display assistance system which may comprise: a database in which a selection-target word set composed of words to be selected in a document of a specific field and a non-selection-target word set composed of words to not be selected in the document of the specific field are registered; a learned word-selection model having been applied with machine learning for estimating a label for a given word, the label indicating at least one of a selection-target word or a non-selection-target word according to a context related to the word; a document acceptance unit which accepts a display-target document; a text pre-processing unit which segments each of a plurality of words from the accepted display-target document; a word classification unit which classifies, based on the database, each of the plurality of words in the accepted display-target document into at least one of a selection-target word, a non-selection-target word, or an indeterminate word; a text post-processing unit which generates output data by imparting predetermined character attribute information to a predetermined word in the display-target document; and an output unit which outputs the output data. If a label indicating the selection-target word is estimated for the classified indeterminate word, the learned word-selection model may classify the indeterminate word into a selection-target word. In addition, the text post-processing unit may impart the predetermined character attribute information to the classified selection-target word.

For each of the plurality of words, the word classification unit may classify a word, which has failed to be classified into either the target-selection word or the non-selection-target word based on the database, as the indeterminate word.

The present invention according to another aspect is a document display assistance system which may comprise: a database in which a plurality of documents is registered; a learned word-selection model having been applied with machine learning for estimating a label for a given word, the label indicating at least one of a selection-target word or a non-selection-target word according to the context related to the word; a document acceptance unit which accepts an input of a display-target document; a text pre-processing unit which segments each of a plurality of words from the accepted display-target document; a word classification unit which calculates a predetermined score for each of the plurality of segmented words based on the database and classifies the segmented word into at least one of a selection-target word, a non-selection-target word, or an indeterminate word according to the calculated predetermined score; a text post-processing unit which generates output data by imparting predetermined character attribute information to a predetermined word in the display-target document; and an output unit which outputs the output data. If a label indicating the selection-target word is estimated for the classified indeterminate word, the learned word-selection model classifies the indeterminate word into a selection-target word. In addition, the text post-processing unit imparts the predetermined character attribute information to the classified selection-target word.

The database may include a corpus of positive example documents defined as correct cases. If a first score calculated for the word using the positive example document corpus exceeds a first threshold, the word classification unit may classify the word into the selection-target word.

The database may further include a corpus of negative example documents defined as incorrect cases. The word classification unit calculates the first score based on a total number of documents in which the word appears in the entire positive example documents of the positive example document corpus and the entire negative example documents of the negative example document corpus, with respect to the number of documents in which the word appears in the entire positive example documents of the positive example document corpus.

The word classification unit may classify the word into the non-selection-target word based on a second score depending on a frequency of the document in which the word appears with respect to the entirety of the positive example documents of the positive example document corpus and the entirety of the negative example documents of the negative example document corpus. For example, if a second score depending on a predetermined inverse document frequency fails to exceed a second threshold based on the entirety of the positive example documents of the positive example document corpus and the entirety of the negative example documents of the negative example document corpus, the word classification unit may classify the word into the non-selection-target word. Alternatively, if a second score depending on a predetermined document frequency exceeds a second threshold, the word classification unit may classify the word into the non-selection-target word.

In addition, the document display assistance system may further comprise a learned document classification model having been applied with machine learning for calculating a degree of correctness of a document depending on an appearance frequency of a word in the specific field by using a first document group in a specific field document corpus related to the specific field and a second document group in a general field document corpus in a larger field than the specific field as learning data.

In addition, the document display assistance system may further comprise a document extraction unit which randomly extracts the second document group from the general field document corpus such that the number of documents in the second document group is substantially the same as the number of documents in the first document group.

The learned document classification model may accept a classification-target document, and estimate whether the document is a correct document or an incorrect document with reference to a predetermined threshold by calculating a degree of correctness of the accepted classification-target document.

The above-described text post-processing unit may generate the output data which is configured to display the predetermined word imparted with the predetermined character attribute information in a visually differentiated manner.

Further, the present invention according to another aspect may be a document display assistance method for displaying a predetermined word in a display-target document in a visually differentiated manner. The method may comprise: registering a selection-target word set composed of words to be selected in a document of a specific field and a non-selection-target word set composed of words to not be selected in the document of the specific field in a database; constructing a learned word-selection model having been applied with machine learning for estimating a label for a given word, the label indicating at least one of a selection-target word or a non-selection-target word according to a context of the word; segmenting each of a plurality of words from the accepted display-target document; classifying, based on the database, each of the plurality of words in the accepted display-target document into at least one of a selection-target word, a non-selection-target word, or an indeterminate word; generating output data by imparting predetermined character attribute information to a predetermined word in the display-target document; and outputting the output data. If a label indicating the selection-target word is estimated for the classified indeterminate word, the learned word-selection model may classify the indeterminate word into a selection-target word. In addition, generating output data may include imparting the predetermined character attribute information to the classified selection-target word.

Further, the present invention according to another aspect may be a document display assistance method for displaying a predetermined word in a display-target document in a visually differentiated manner. The method may comprise: constructing a learned word-selection model having been applied with machine learning for estimating a label for a given word, the label indicating at least one of a selection-target word or a non-selection-target word according to the context of the word; segmenting each of a plurality of words from the accepted display-target document; based on a database in which a plurality of documents is registered, calculating a predetermined score for each of the plurality of segmented words and classifying the segmented word into at least one of a selection-target word, a non-selection-target word, or an indeterminate word according to the calculated predetermined score; generating output data by imparting predetermined character attribute information to a predetermined word in the display-target document; and outputting the output data. If a label indicating the selection-target word is estimated for the classified indeterminate word, the learned word-selection model may classify the indeterminate word into a selection-target word. In addition, generating output data may include imparting the predetermined character attribute information to the classified selection-target word.

In addition, the method may further comprise constructing a learned document classification model having been applied with machine learning for calculating a degree of correctness of a document depending on an appearance frequency of a word in the specific field using a first document group in a specific field document corpus related to the specific field and a second document group in a general field document corpus having a larger field than the specific field as learning data.

Further, the present invention may be understood as a computer program which implements the above-described methods by a computing device, and as a product including a recording medium in which such computer program is recorded in a non-transitory manner.

In the present disclosure, the term "means" does not merely mean a physical means but also encompasses the case where the functions of such means are achieved by software. In addition, a function of one means may be achieved by two or more physical means, and functions of two or more means may be achieved by one physical means.

Further, in the present disclosure, the term "system" includes an ensemble where multiple apparatuses (or functional modules achieving specific functions) are logically assembled, regardless of whether each apparatus or functional module is physically configured as a single entity or as a separate entity.

Effect of the Invention

According to the present invention, for a document of a specific field to which a user seeks to refer, a word that is deemed significant or relevant in the specific field can be estimated as a selection-target word using a word selection model, and such estimated selection-target word can be displayed in a visually differentiated manner.

Other technical features, objects, effects, or advantages of the present invention will become apparent by the following embodiments described with reference to the attached drawings.

BRIEF DESCRIPTION OF THE DRAWINGS

FIG. 3B is a diagram for illustrating estimation made by a learned word-selection model in a document display assistance system according to an embodiment of the present invention.

FIG. 11 is a diagram showing an example of a hardware configuration of a document display assistance system according to an embodiment of the present invention.

DESCRIPTION OF THE EMBODIMENTS

Embodiments of the present invention will be described below with reference to the drawings. However, the embodiments described below are only illustrations, and there is no intention to exclude the application of various variations or technologies not expressly stated below. The present invention may be implemented with various variations (e.g., by combining each embodiment) without departing from its spirit. In addition, the same or similar parts will be denoted with the same or similar references in the following descriptions of the drawings. The drawings are schematic and do not necessarily correspond to the actual dimensions or ratios. Parts may also be included wherein the dimensional relationship or ratio between each other is different among the drawings.

In the present disclosure, a document display assistance system and a document display assistance method are described in which a word that characteristically indicates the content of a document to be displayed is selected by performing a selection process on the document, using highly-relevant documents which are screened by a filtering process from among a multitude of documents in a specific field, and the document is displayed such that the selected word can be visually differentiated. As described below, the filtering process involves use of a document classification model that has been applied with machine learning using a known machine learning algorithm such as a neural network. In addition, the word selection process involves use of a word selection model that has been applied with machine learning. In the present disclosure, the term "word" is not limited to a term or jargon, but represents a set of words in a broad sense and refers to a word having a grammatical function, and is not limited to one word and includes a phrase or a combination of a plurality of words.

First Embodiment

The present embodiment is directed to a document display assistance system and a document display assistance method of: classifying each of the words in a text body of a document into any of: a selection-target word, a non-selection-target word, and an indeterminate word, using a word database in which words related to a specific field are registered; making an estimation as to whether the classified indeterminate word is either a selection-target word or a non-selection-target word using a learned word-selection model that has been applied with machine learning using a predetermined machine learning algorithm; and displaying the document in which such classified or estimated selection-target word is visually differentiated.

Figure 1:
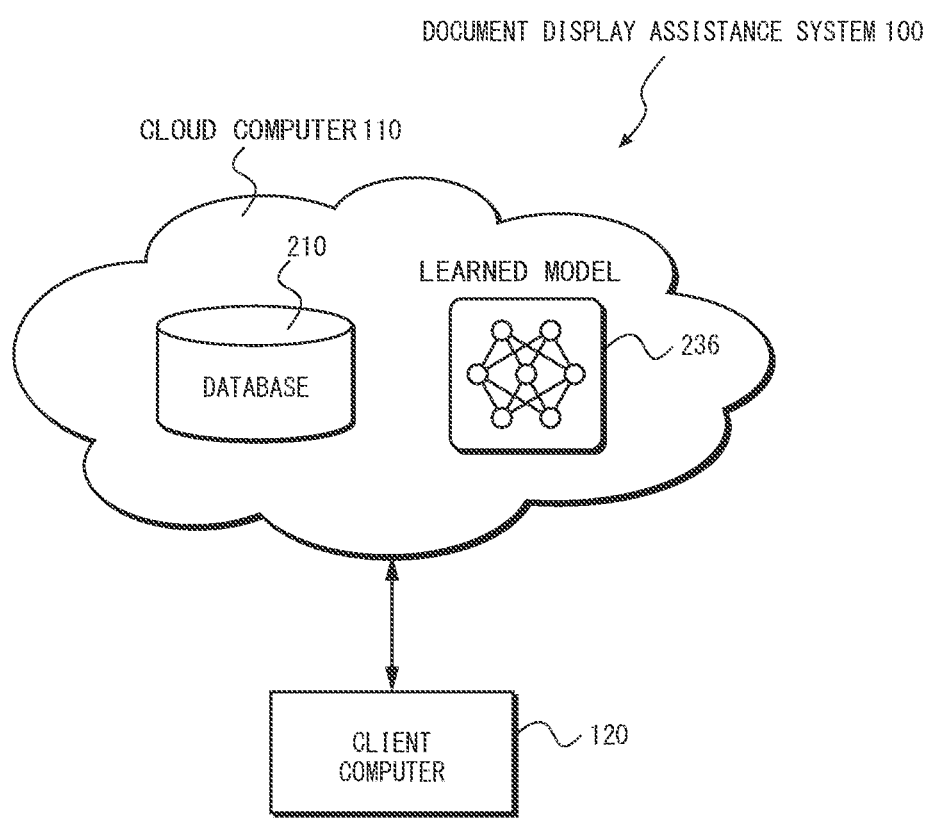
FIG. 1 is a block diagram showing an example of a schematic configuration of a document display assistance system according to an embodiment of the present invention.

FIG. 1 is a block diagram showing an example of a schematic configuration of a document display assistance system according to an embodiment of the present invention. As shown in FIG. 1, the document display assistance system 100 is configured to include, for example, a cloud computer 110 and a client computer 120. Here, the document display assistance system 100 is configured as a cloud-based system, but the configuration is not limited thereto, and the document display assistance system 100 may be configured as a client/server system or a stand-alone system.

The cloud computer 110 is, for example, a computing device with functionality to analyze documents specified by the client computer 120. A hardware configuration of the cloud computer 110 is shown, for example, in FIG. 11, but the details of such configuration are omitted because they are already known. The cloud computer 110 sends the analysis results back to the client computer 120. The cloud computer 110 may be configured to include a word database 210 and a learned word-selection model 236 that has been applied with machine learning, as will be described with reference to FIG. 2. The cloud computer 110 may be configured by one or more computing devices.

The client computer 120 is a computing device operated by a user of the document display assistance system 100. The client computer 120 may be implemented with, for example, a web browser and may access the cloud computer 110 via the web browser. Alternatively, a dedicated browser or application adapted for the document display assistance system 100 may be implemented instead of the web browser. As an example, the client computer 120 sends to the cloud computer 110 a document (e.g., the document data itself or the URL of the document data) for which the user wants to determine whether the document has relevance to a specific field. In response, the cloud computer 110 sends the analysis results of the document back to the client computer 120, and the client computer 120 in turn displays the analysis results on a user interface.

Figure 2:
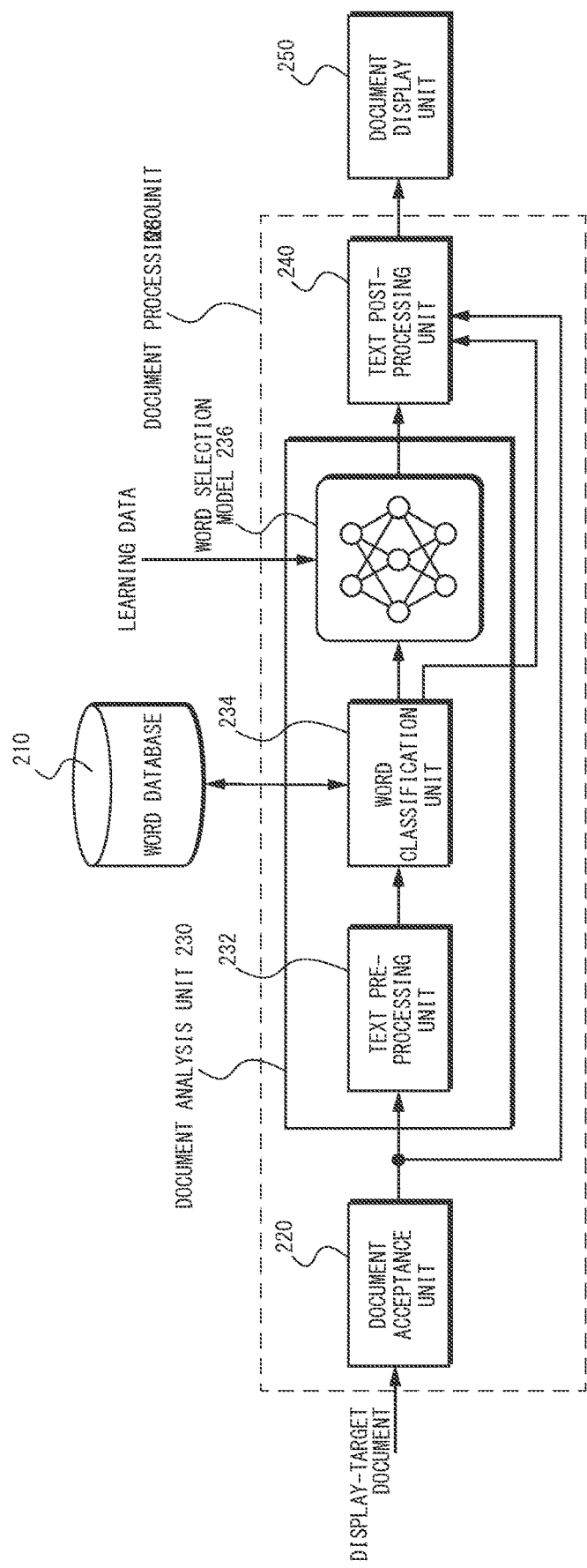
FIG. 2 is a block diagram for illustrating a functional configuration of a document display assistance system according to an embodiment of the present invention.

The document display assistance system 100 will be further described hereinafter. FIG. 2 is a block diagram for illustrating a functional configuration of a document display assistance system according to an embodiment of the present invention. In FIG. 2, the document display assistance system 100 is configured to include, for example, the word database 210, a document acceptance unit 220, a document analysis unit 230 with the learned word-selection model 236, a text post-processing unit 240, and a document display unit 250. If the system 100 is a cloud-based document display assistance system as described above, the word database 210, the document acceptance unit 220, the document analysis unit 230, and the text post-processing unit 240 may be implemented as a function of the cloud computer 110, and the document display unit 250 may be implemented as a function of the client computer 120, but this is not a limitation. For example, all or part of the text post-processing unit 240 may be implemented as a function of the client computer 120. It should be noted that the document acceptance unit 220, the document analysis unit 230, and the text post-processing unit 240 form a document processing unit 260.

The word database 210 is a database system in which a set of words to be selected (hereinafter referred to as the "selection-target word set") and a set of words to not be selected (hereinafter referred to as the "non-selection-target word set") regarding documents of a specific field are registered. The words are classified according to the word class classification. The word database 210 is a form of dictionary database. The word class classification means that words are divided into classes depending on scores imparted with reference to a predetermined threshold by performing a word-by-word scoring (e.g., on a scale of −100 to 100) based on a predetermined statistical model, using, for example, a corpus of documents that are pre-defined as correct cases (hereinafter referred to as the "positive example documents") and a corpus of documents that are pre-defined as incorrect cases (hereinafter referred to as the "negative example documents"). The correct case refers to a case in which a document has relevance to a specific field, and an incorrect case refers to a case in which a document has no relevance to a specific field. More specifically, the selection-target word set refers to a set of words that the document display assistance system 100 wants to select reliably in a given display-target document, and the non-selection-target word set refers to a set of words that the document display assistance system 100 does not want to select reliably. A set of words having, for example, a score that is neither low nor high (e.g., a score of 0 or approximately 0), obtained as a result of the word class classification, is an indeterminate word set.

The document acceptance unit 220 serves as an interface for accepting, as a display-target document, a document to be visually determined as to whether it has relevance to a specific field. The document accepted by the document acceptance unit 220 is displayed with its relevance to a specific field being visually represented by the document display unit 250 described below. As an example, the document acceptance unit 220 accepts a document acquired from a literature database on the Internet. Alternatively, the document acceptance unit 220 may accept a document acquired from a local computer. As another example, the document acceptance unit 220 may accept a document specified by the user via a web browser. The document acceptance unit 220 passes the accepted document to the document analysis unit 230 as well as to the text post-processing unit 240.

The document analysis unit 230 performs analysis of the accepted document and identifies a word in the document that is deemed significant in a specific field. The identified word is displayed in a visually differentiated manner (e.g., highlighted). As described above, in this example, the document analysis unit 230 is configured to include a text pre-processing unit 232, a word classification unit 234, and the word-selection model 236.

The text pre-processing unit 232 segments a plurality of words from the text body in the accepted document. A morphological analysis unit that performs morphological analysis of sentences, which is obvious to those skilled in the art, is a form of the text pre-processing unit 232. The text pre-processing unit 232 passes each of the segmented words to the word classification unit 234.

For each of the words in the accepted document, the word classification unit 234 refers to the word database 210 in order to identify and classify whether it is a selection-target word, a non-selection-target word, or an indeterminate word. More specifically, for the word segmented by the text pre-processing unit 232, the word classification unit 234 refers to the word database 210 and, if the word exists in the selection-target word set, imparts or associates a learning label (e.g., "1") indicating a selection-target word to or with the word, and if the word exists in the non-selection-target word set, imparts or associates a learning label (e.g., "−1") indicating a non-selection-target word to or with the word. In addition, if the segmented word does not exist in either the selection-target word set or the non-selection-target word set, the word classification unit 234 classifies such word as an indeterminate word. In this example, learning labels are not imparted to the indeterminate words. The word classification unit 234 passes each word (word string) classified as a selection-target word, a non-selection-target word, or an indeterminate word to the word-selection model 236, as well as to the text post-processing unit 240. As a variation example, the word classification unit 234 may pass words classified as indeterminate words to the word selection model 236 and may pass words classified as selection-target words and non-selection-target words to the text post-processing unit 240.

The word selection model 236 of the present embodiment is a learned model that has been applied with machine learning for estimating, for each word segmented from a text sentence in a document, a label (e.g., whether such word is a selection-target word or a non-selection-target word) for such word while taking the context and/or the word meaning pertaining to such word into consideration. The context refers to the logical relationship and the degree of connection between individual words in a sentence and/or between individual sentences and clauses. For example, if a word is used in the same meaning, then the context is the same, and if a word is used in different meaning, then the context is different. The context depends on the word strings (which can be sentences or clauses) before and after the relevant word. In the present disclosure, the word selection model 236, which is either pre-learning or under-learning, may also simply be referred to as the "word selection model 236," but for the purpose of clarifying that it has already been learned, it may also be referred to as the "learned word-selection model 236." The word selection model 236 may be applied with a sequence-labeling model such as a Hidden Markov Model (HMM) and a Long Short-Term Memory (LSTM), but this is not a limitation. In machine learning, for example, each of the words segmented by the morphological analysis process is converted into a word embedding vector. The word embedding vector is a method representing of a word vocabulary by embedding a vector representing the feature amount of an individual word in a vector space that represents the features of the word vocabulary. Although the word embedding vectors are used in the present disclosure, the present disclosure is not limited thereto, and other feature vectors may be used. As described below, indeterminate words classified into the indeterminate word set are input into the word selection model 236, and the labels for such indeterminate words are estimated.

Figure 3A:
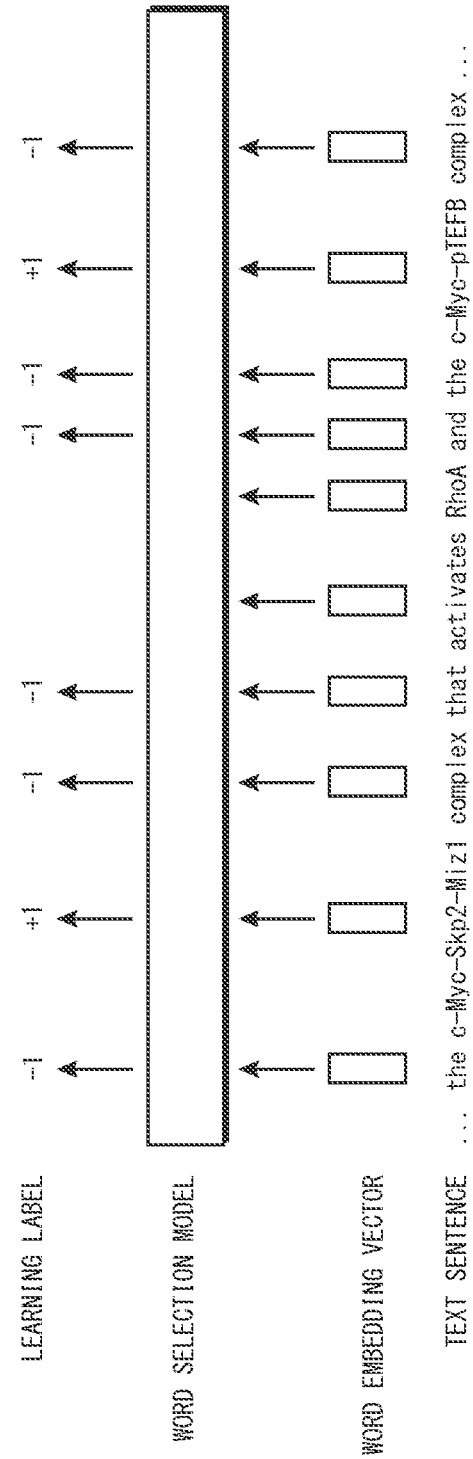
FIG. 3A is a diagram for illustrating machine learning of a word selection model in a document display assistance system according to an embodiment of the present invention.

For example, consider a case where the word selection model 236 is subject to machine learning using the text sentence " . . . the c-Myc-Skp2-Miz1 complex that activates RhoA and the c-MycpTEFB complex . . . " in a document in the field of cancer genomic medicine as the learning data. As shown in FIG. 3A, the text sentence is segmented into a plurality of words, and each segmented word is converted into a word embedding vector. Each word converted into a word embedding vector is input into the word selection model 236, thereby the word selection model 236 performs machine learning such that the same output as that of the pre-given learning label may be obtained for words corresponding to the selection-target words and the non-selection-target words. In the example shown in FIG. 3A, the words "activates" and "RhoA" are indeterminate words and are therefore not given a learning label.

Referring back to FIG. 2, once the machine learning as described above is performed, the word selection model 236 estimates a label for the input word while taking the context (e.g., the preceding and following word strings) into consideration. More specifically, the word selection model 236 imparts a label of either the selection-target word or the non-selection-target word to the input word, and outputs the pair of such word and label as an estimated result. As an example, the words input into the word selection model 236 include words other than indeterminate words (e.g., the selection-target words and/or non-selection-target words) as context information, in addition to the indeterminate words. This allows the estimation to be made utilizing the generalization capabilities of the learned model. As another example, the words to be input may be, for example, words classified as indeterminate words by the word classification unit 234.

More specifically, for the document containing the above-mentioned text sentence " . . . the c-Myc-Skp2-Miz1 complex that activates RhoA and the c-MycpTEFB complex . . . ," the word classification unit 234 classifies the words "activates" and "RhoA" into the indeterminate words. In this case, the learned word-selection model 236 estimates the labels for the words "activates" and "RhoA," which are classified into the indeterminate words, according to the context of such words and their surroundings, as shown in FIG. 3B. FIG. 3B shows that, for the word "activates," the label "−1" is estimated as a non-selection-target word from the context of such word, and that, for the word "RhoA," the label "+1" is estimated as a selection-target word from the context of such word.

The text post-processing unit 240 modifies the text sentences in the accepted document so that the selection-target words are displayed in a visually differentiated manner in the document based on the estimated results output from the word selection model 236. More specifically, the text post-processing unit 240 generates, for the document that is passed from the document acceptance unit 220, output data which is configured such that the selection-target words are displayed in a visually differentiated manner in the text sentences of such document on the basis of the selection-target words and non-selection-target words that are passed from the word classification unit 234 and the selection-target words that are estimated and passed from the word selection model 236. The visually differentiated manner typically refers to highlighting. Examples of such manner include, without limitation, underlining, coloring, italics, boldface, magnification, frame enclosing, and/or markers. The output data contains, for example, character attribute information indicating such manners in association with the selection-target words in the text sentences in the document. The text post-processing unit 240 passes the generated output data to the document display unit 250.

Figure 4:
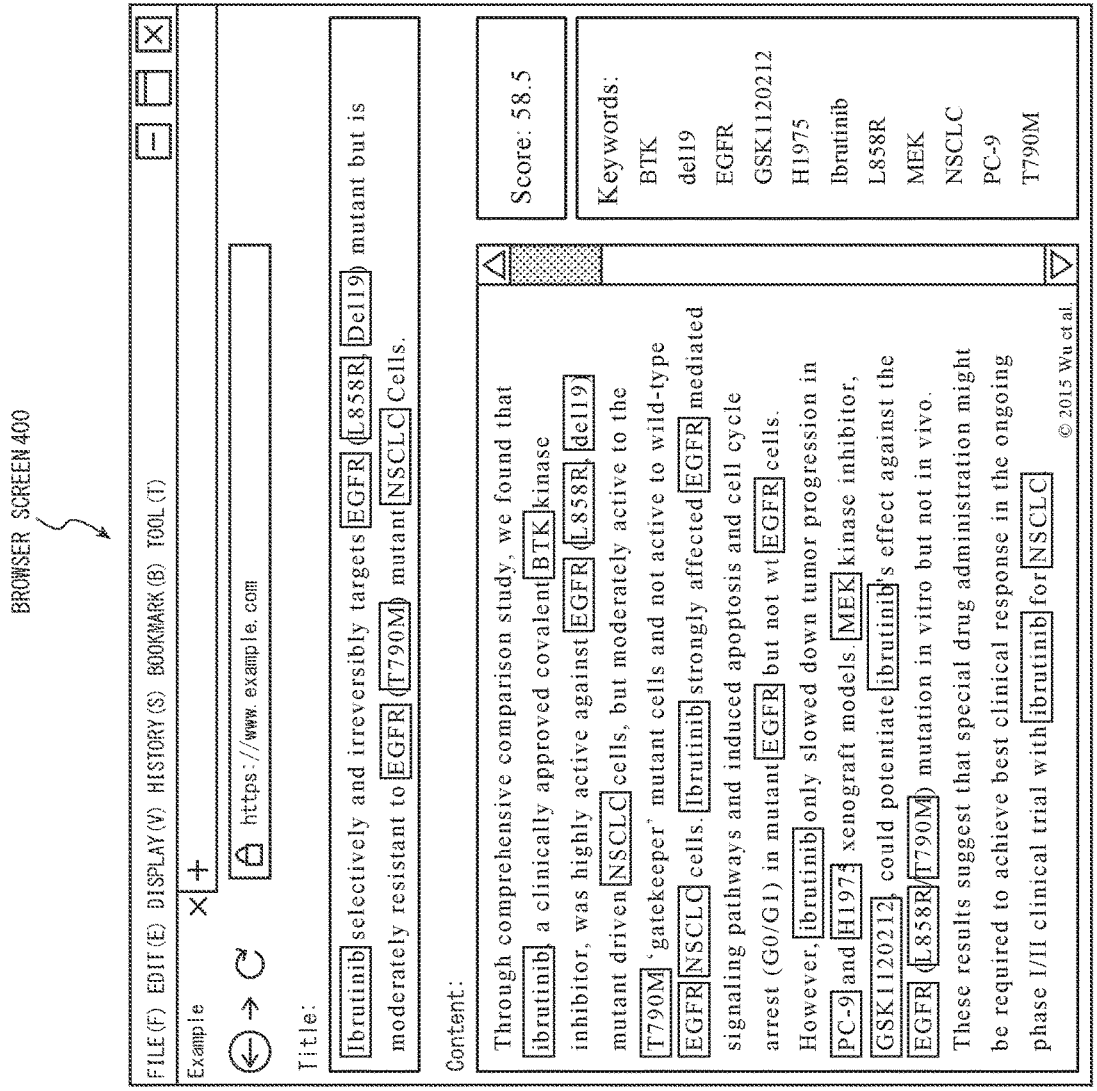
FIG. 4 is a diagram showing an example of a document displayed on a browser screen in a document display assistance system according to an embodiment of the present invention.

The document display unit 250 displays the modified document based on the output data passed from the text post-processing unit 240. As described above, the document display unit 250 may be implemented, for example, as part of the function of the client computer 120. For example, the document display unit 250 interprets the output data passed from the text post-processing unit 240, and displays the document on a user interface in a manner such that the selection-target words in the text sentences in the document are visually differentiated in accordance with the character attribute information contained in the output data, as shown in FIG. 4. That is, FIG. 4 shows an example of a browser screen 400. More specifically, the words identified as the selection-target words are highlighted in the display-target document displayed on the browser screen (the words are represented as frame-enclosed characters in FIG. 4). In this example, the score of the document, related keywords, and the like, are additionally indicated on the right side of the browser screen 400.

As described above, according to the present embodiment, for a document to be determined as to whether it has relevance to a specific field, the document display assistance system 100 immediately allows a determination to be made as to whether such document has relevance to the specific field. This is achieved by the document display assistance system 100 displaying words related to the specific field in a visually differentiated manner so that the user can easily and quickly follow the words displayed in a visually differentiated manner.

In particular, according to the present embodiment, the document display assistance system 100 allows a more accurate estimation to be made as to whether a word, which was previously unable to be determined as to whether it was a selection-target word or a non-selection-target, falls under the selection-target word set related to a specific field. This is achieved by inputting a word that is classified as an indeterminate word by the word classification unit 234 into the word selection model 236 which has been applied with machine learning for calculating the degree of similarity of the context with respect to a predetermined word in the document of a specific field, by using the registered selection-target word set and non-selection-target word set.

Further, according to the present embodiment, the selection-target words related to a specific field are not required to be manually pre-set or pre-registered, and the user is therefore freed from the cumbersome setting and/or registration.

Second Embodiment

The present embodiment is a variation of the first embodiment described above and is directed to a document display assistance system and a document display assistance method which make use of a document database configured to include a positive example document corpus and a negative example document corpus.

Figure 5:
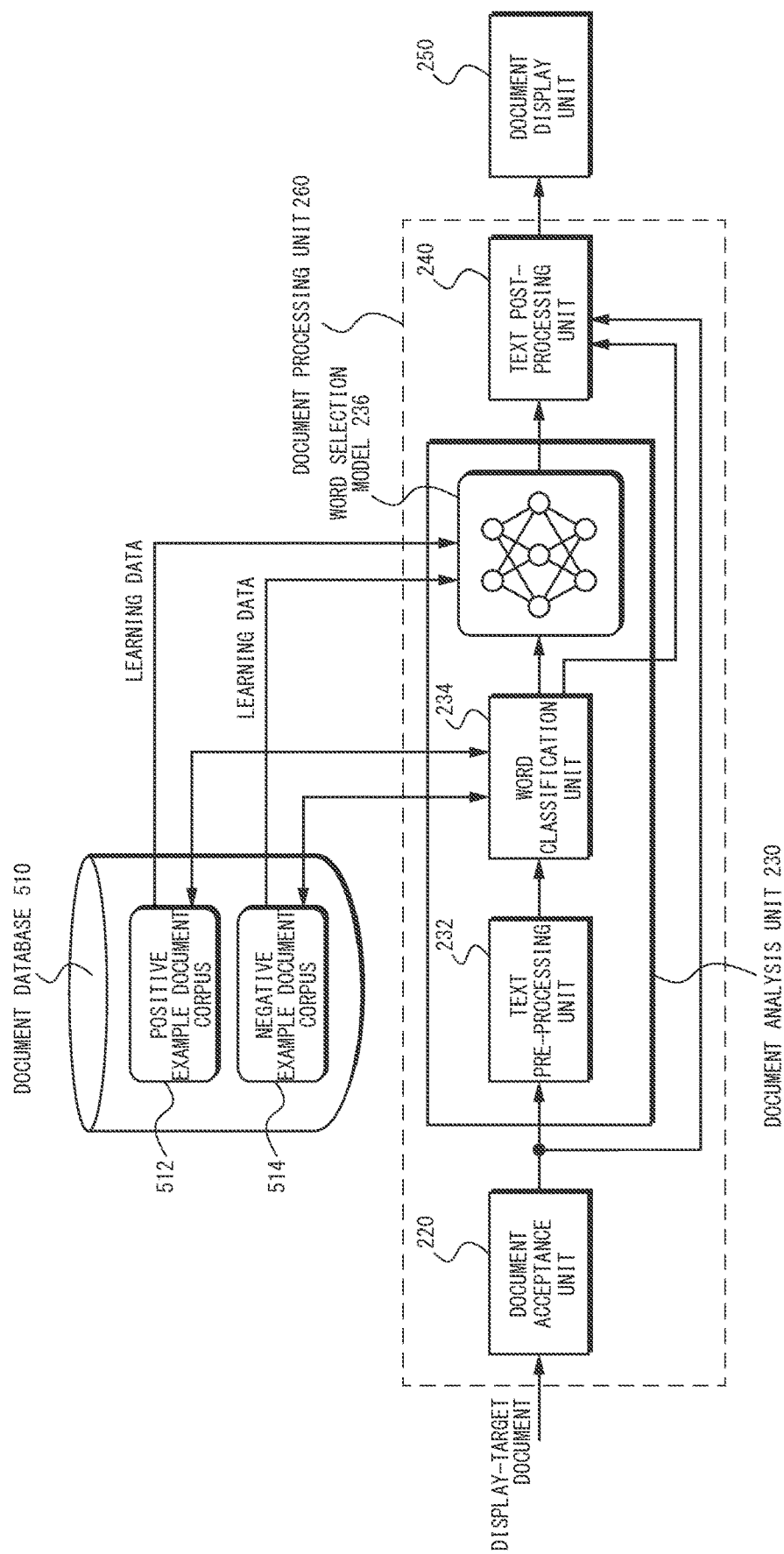
FIG. 5 is a block diagram for illustrating a functional configuration of a document display assistance system according to an embodiment of the present invention.

FIG. 5 is a block diagram for illustrating a functional configuration of a document display assistance system according to an embodiment of the present invention. In FIG. 5, the same components as those in the embodiment described above are denoted with the same reference codes and the descriptions thereof will therefore be omitted as appropriate hereinafter. More specifically, as shown in FIG. 5, the document display assistance system 100 of the present embodiment differs from the first embodiment described above in that a document database 510 is employed in place of the word database 210 in the first embodiment. In other words, the document database 510 is a form of the database 210 shown in FIG. 1. Accordingly, the word classification unit 234 is configured to operate adaptively to the document database 510.

The document database 510 is configured to include, for example, a positive example document corpus 512 and a negative example document corpus 514. As described above, the positive example document corpus 512 is a database in which documents pre-defined as correct cases (positive example documents) are registered. Also, the negative example document corpus 514 is a database in which documents pre-defined as incorrect cases are registered.

As described in other embodiments, such document database 510 is constructed by inputting a multitude of documents into a learned document classification model and by classifying each of the input documents into either a positive example document or a negative example document. The learned document classification model has been applied with machine learning using: a document corpus of a specific field, the domain of which is small but the appearance frequency of selection-target words is high; and a document corpus of a general field, the domain of which is larger than the domain of the document corpus of the specific field. For example, documents collected and classified from document corpora related to journals, academic papers, and the like, may be accumulated in the document database 510.

There are a vast number of documents, such as journals, academic papers, and the like, around the world. Some of these may be obtained free of charge from open-access databases, but often they must be purchased from paid databases. While such documents are generally configured to include bibliographic matters, abstracts, and body text, some databases (e.g., PubMed Central, etc.) provide the body text free of charge or at a low price. Therefore, the present disclosure assumes that the body text of such documents that can be obtained free of charge or at a low price is accumulated in the document database 510 as positive and negative example documents, but this is not intended to be a limitation.

For each of the words in the accepted document, the word classification unit 234 refers to the document database 510 in order to identify and classify whether it is a selection-target word, a non-selection-target word, or an indeterminate word. More specifically, the word classification unit 234 performs a word-by-word scoring (e.g., on a scale of 0 to 100) according to a predetermined statistical model using the positive example document corpus 512 and the negative example document corpus 514, and classifies the words into any of the selection-target word, the non-selection-target word, and the indeterminate word, depending on the imparted scores with reference to a predetermined threshold. The word classification unit 234 classifies, for example, a varying word, which can be a selection-target word or fails to be a selection-target word depending on the context, or a word having the calculated score of a neutral score (e.g., near 0) as the indeterminate word, and reserves the classification as to whether or not the word is a selection-target word. As described above, the learned word-selection model 236 estimates whether the indeterminate word is a selection-target word or a non-selection-target word.

In this example, the classification of selection-target words according to the scoring by the word classification unit 234 is performed as described below. More specifically, the word classification unit 234 calculates the scores (the degree of correctness) for the segmented words using, for example, a scoring function given by the following formula:

$$score_+(t) = p_{smoothed}(D_+|t) = \frac{|\{d \in D_+ : t \in d\}| + \mu\alpha}{|\{d \in D : t \in d\}| + \alpha} \qquad \text{Formula 1}$$

where t denotes a word, d denotes a single document, D denotes the entirety of the documents in the document database 510, and D+ denotes the entirety of the positive example documents in the positive example document corpus 512. In addition, μ denotes a smoothing function given by the following formula, and α denotes a predetermined factor for preventing low-appearance-frequency words from being given a high score. The smoothing function μ may be omitted by setting α to 0. Alternatively, other methods may be used, such as uniformly setting the score for low-appearance-frequency words to zero without using the smoothing function:

$$\mu = \frac{\Sigma_t |\{d \in D_+ : t \in d\}|}{\Sigma_t |\{d \in D : t \in d\}|} \qquad \text{Formula 2}$$

In other words, the above Formula 1 shows a ratio of the number of documents N+ in which a word appears in the positive example documents D+ in the positive example document corpus 512 to the number of documents N in which such word appears in the entirety of the documents D (i.e., the positive example document corpus 512 and the negative example document corpus 514) (e.g., even if such word appears (is present) only once in a document, this will still be counted as +1).

For example, consider the scores for word t1 "EGFR" (Epidermal Growth Factor Receptor) and word t2 "the" contained in a document in a specific field. For ease of description, α=0 is assumed.

Figure 6:
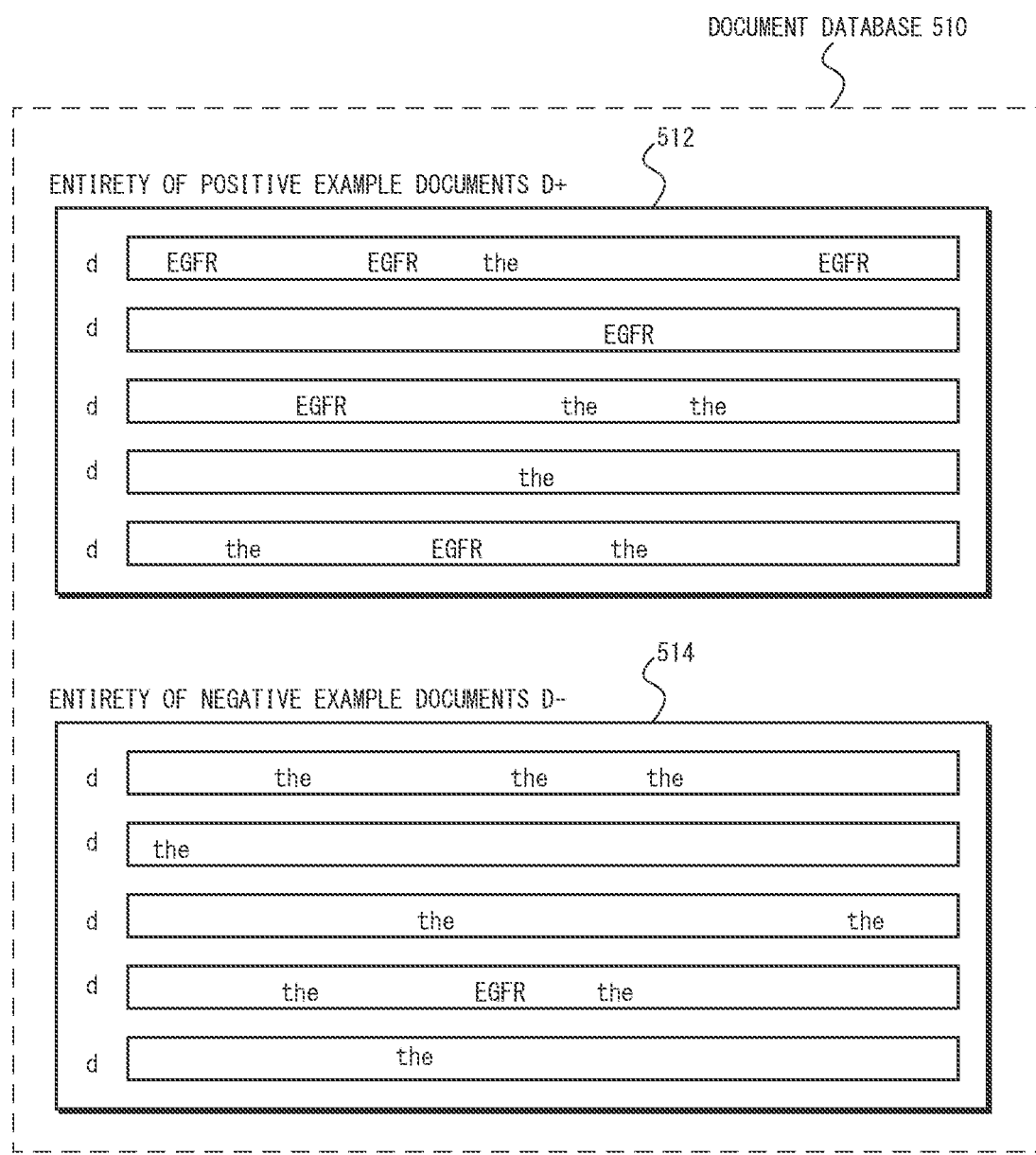
FIG. 6 is a diagram illustrating an example of a configuration of a document database in a document display assistance system according to an embodiment of the present invention.

For example, as shown in FIG. 6, the entirety of the documents D, which are composed of the entirety of the positive example documents D+ and the entirety of the negative example documents D−, are registered in the document database 510. The documents d in the entirety of the positive example documents D+ and the entirety of the negative example documents D− contain the words "EGFR" and "the."

Based on Formula 1, the number of positive example documents N+ containing words t is as follows:

$$N+ = |d \in D+ : t \in d|,$$

and the number of documents N containing words t in the entirety of the documents D is as follows:

$$N = |d \in D : t \in d|.$$

Accordingly, the score for word t1 "EGFR" is as follows:

$$score_+(EGFR) = \frac{|d \in D_+ : EGFR \in d|}{|d \in D : EGFR \in d|} = \frac{4}{5} = 0.8 \qquad \text{Formula 3}$$

Similarly, the score for word t2 "the" is as follows:

$$score_+(\text{the}) = \frac{|d \in D_+ : \text{the} \in d|}{|d \in D : \text{the} \in d|} = \frac{4}{9} \approx 0.4 \qquad \text{Formula 4}$$

For each of the segmented words, the word classification unit 234 calculates the score as described above, and identifies and classifies (labels) a word with a calculated score exceeding a first threshold (word t1 "EGFR" in the example above) as a selection-target word.

For example, the word classification unit 234 may identify and classify the following group of words as selection-target words for a document in the field of cancer genomic medicine:

L858R/E545K/H1047R/T790M/EGFR-TKIs/EGFR-TKI/G12C/G13D/MuTect/GISTIC/E542K/ASXL1/FLT3-ITD/V600E/NRAS/G12V/ . . .

On the other hand, the classification of non-selection-target words by the word classification unit 234 is performed as described below. More specifically, the word classification unit 234 calculates the scores (the degree of incorrectness) for the segmented words using, for example, an inverse document frequency (idf) function given by the following formula:

$$score_-(t) = \log \frac{|D|}{|\{d \in D : t \in d\}|} \qquad \text{Formula 5}$$

In other words, the inverse document frequency function outputs a low score if the frequency of the documents in which a word appears is high with respect to the entirety of the documents. Typically, words used in any document, such as prepositions or conjunctions, have a relatively low score. For each of the segmented words, the word classification unit 234 calculates the score using the inverse document frequency function as described above, and identifies and classifies a word with a calculated score failing to exceed a second threshold as a non-selection-target word.

Similarly, consider the scores obtained by the inverse document frequency function for the entirety of the positive example documents D+ and the entirety of the negative example documents D− shown in FIG. 6.

More specifically, based on Formula 5, the score for word t1 "EGFR" obtained by the inverse document frequency function is as follows:

$$score_-(EGFR) = \log \frac{|D|}{|\{d \in D : EGFR \in d\}|} = \log \frac{10}{5} \approx 0.7 \qquad \text{Formula 6}$$

Similarly, the score for word t2 "the" obtained by the inverse document frequency function is as follows:

$$score_-(\text{the}) = \log \frac{|D|}{|\{d \in D : \text{the} \in d\}|} = \log \frac{10}{9} \approx 0.1 \qquad \text{Formula 7}$$

It should be noted that the description is given using the inverse document frequency function idf in the present example, but a document frequency function df may also be used. In such a case, words with calculated scores exceeding a predetermined threshold are identified and classified as non-selection-target words.

In this way, the word classification unit 234 performs a word-by-word scoring according to a predetermined statistical model, and classifies the words into any of the selection-target word, the non-selection-target word, and the indeterminate word, depending on the imparted scores with reference to a predetermined threshold. The word classification unit 234 then passes the words classified into the selection-target words and the non-selection-target words to the text post-processing unit 240, as described above, and passes the respective words classified into any of the selection-target word, the non-selection-target word, and the indeterminate word, to the word selection model 236. Accordingly, as described above, the word selection model 236 estimates a label for the input indeterminate word (i.e., whether or not such word is a selection-target word) while taking the context of such indeterminate word into consideration.

As described above, according to the present embodiment, the same advantages as those of the first embodiment may be achieved, and a document display assistance system 100 can be constructed in an efficient manner at a low cost by utilizing the body text of documents which can be obtained free of charge or at a low price as positive and negative example documents.

Third Embodiment

The present embodiment is a variation of the second embodiment described above and is directed to a method for constructing a document database configured to include a positive example document corpus and a negative example document corpus.

Figure 7:
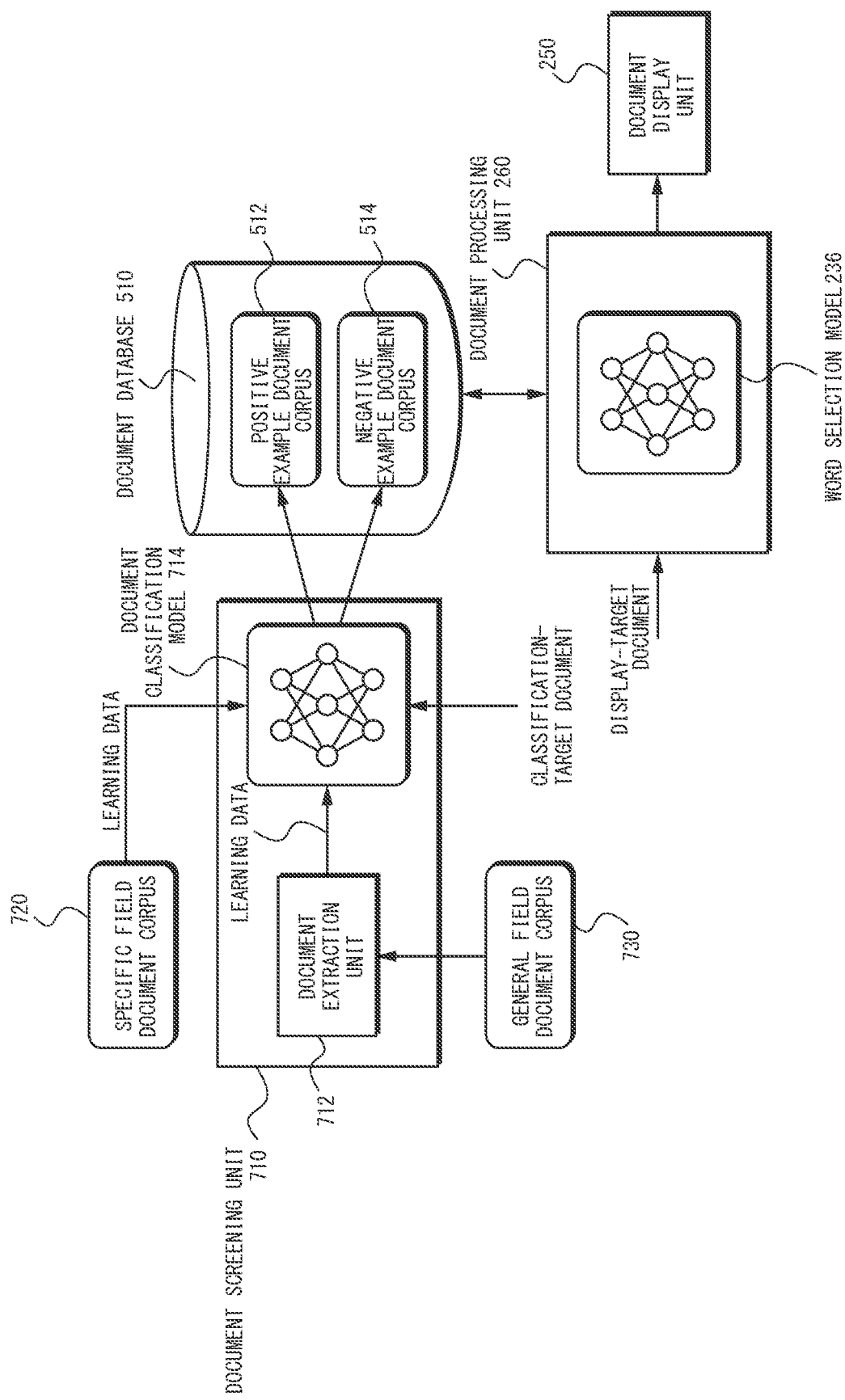
FIG. 7 is a block diagram showing an example of a schematic configuration of a document display assistance system according to an embodiment of the present invention.

FIG. 7 is a block diagram showing an example of a schematic configuration of a document display assistance system according to an embodiment of the present invention. In FIG. 7, the same components as those in the embodiment described above are denoted with the same reference codes and the descriptions thereof will therefore be omitted as appropriate hereinafter. More specifically, as shown in FIG. 7, the document display assistance system 100 of the present embodiment differs in that a document screening unit 710 is added to the configuration of the second embodiment described above. In FIG. 7, the document acceptance unit 220, the document analysis unit 230, and the text post-processing unit 240 shown in FIG. 2, etc. are shown in a simplified manner as the document processing unit 260. The document screening unit 710 may be configured to include a document extraction unit 712 and a document classification model 714 as shown in FIG. 7.

A specific field document corpus 720 is a corpus of documents in which the appearance frequency of the words to be the selection-target words is high from among documents in a specific field or domain. As an example, in the case of constructing the positive example document corpus 512 such that words related to the cancer genome field are selected, papers referenced from the knowledge databases "OncoKB" and "COSMIC" related to the cancer genome field may be selected. In the present disclosure, the documents registered in the specific field document corpus 720 may be abstracts in the documents, such as journals and academic papers, and the body text may not be included. The number of documents (i.e., abstracts) registered in the specific field document corpus 720 is small (e.g., about 15,000) compared to a general field document corpus 730 described below.

The general field document corpus 730 is a corpus of documents in the general field, which is a larger domain than the domain of the specific field document corpus 720. As an example, the general field document corpus 730 covers the abstracts of papers provided from "PubMed," which is a free search engine related to life sciences and biomedical fields, including the cancer genome field. Since the number of documents in the general field document corpus 730 is vast (e.g., about 40 million), a predetermined number of documents may be randomly extracted by the document extraction unit 712.

The document extraction unit 712 randomly extracts a predetermined number (e.g., substantially the same number as the number of documents registered in the specific field document corpus 720) of documents (i.e., abstracts), with reference to the general field document corpus 730. Bias in the learned model may be prevented by making the number of documents in the general field document corpus 730 substantially the same as the number of documents registered in the specific field document corpus 720. The document extraction unit 712 inputs the extracted documents into the document classification model 714 as learning data. It should be noted that the description "substantially the same number" does not refer to an exactly matching number of the two but instead a difference in the number that is in a range obvious to those skilled in the art and that does not affect the learning results.

The document classification model 714 is a learned model that has been applied with machine learning for calculating the degree of correctness of the documents depending on the appearance frequency of words in the specific field using a group of documents registered in the specific field document corpus 720 and a group of documents extracted from the general field document corpus 730 via the document extraction unit 712. In the present disclosure, the document classification model 714 uses a "Bag-of-Words" approach to convert the words contained in the text sentences in a document into feature vectors and performs machine learning using known machine learning algorithms. The Bag-of-Words is known as an approach in natural language processing, in which data described in natural language words, i.e., text sentences, is represented by vectors. In other words, the document classification model 714 is formed as a learned model by: calculating the appearance frequency of each word appearing in each document registered in the specific field document corpus 720; calculating the appearance frequency of each word appearing in each general document extracted by the document extraction unit 712; and converting the words into feature vectors in accordance with the calculated appearance frequencies. Other feature vectors, such as the word embedding vectors described above, may be used in place of the Bag-of-Words.

After the machine learning is applied as described above, the document classification model 714 estimates whether the document is a correct document or an incorrect document by calculating the degree of correctness of the document based on the groups of input documents. More specifically, the document classification model 714 compares the calculated degree of correctness to a predetermined threshold, and if the calculated degree of correctness exceeds the predetermined threshold, the document classification model 714 classifies the document as a correct document and registers it in the positive example document corpus 512. In contrast, if the calculated degree of correctness fails to exceed the predetermined threshold, the document classification model 714 classifies the document as an incorrect document and registers it in the negative example document corpus 514. In the present disclosure, the documents input into the learned document classification model 714 are, for example, the text body of the documents, and bibliographic matters or abstracts may not be included. For example, such documents may be the body text of documents referenced from PubMed Central (PMC). In addition, the number of documents (text body) input into the learned document classification model 714 is very large compared to the number of documents (abstracts) input for machine learning, and it could be 1 million or more, as an example.

In this way, the document screening unit 710 classifies a very large number of document groups into either positive example documents or negative example documents by means of the learned document classification model 714, thereby, a document database that contains the positive example document corpus 512 and the negative example document corpus can be constructed.

As described above, according to the present embodiment, the same advantages as those of the embodiments described above may be achieved. In particular, according to the present embodiment, the document classification model 714 can be subject to machine learning in an efficient manner because a limited number of documents and parts thereof (e.g., abstracts) are used as learning data. In particular, the document classification model 714 can efficiently learn whether the document is a positive example document or a negative example document because the documents serving as learning data are documents extracted from each of: a corpus of documents in which the appearance frequency of the words to be the selection-target words in relation to a specific domain is high; and a corpus of documents in the general field having a larger domain than such specific domain.

In addition, according to the present embodiment, the document classification model 714 that has been applied with machine learning can determine whether the input document is a correct document or an incorrect document with reference to a predetermined threshold because the document classification model 714 can calculate, for the input documents, the degree of correctness of the document depending on the appearance frequency of the words in the specific field.

Further, according to the present embodiment, regarding the words which are not registered in the conventional dictionary databases but should essentially be determined as selection-target words in documents of a specific field, such words can be correctly estimated as being the selection-target words. For example, in the field of cancer genomic medicine, the word for "mutation" (e.g., represented as "L747S") is described in a very large number of patterns in documents in this field. Therefore, such a word is virtually impossible to deal with in the conventional dictionary databases; however, according to the present embodiment, such word can be estimated as being the selection-target word.

Next, the flow of processing in the document display assistance system 100 shown in the respective embodiments described above will be described using FIGS. 8 to 10.

Figure 8:
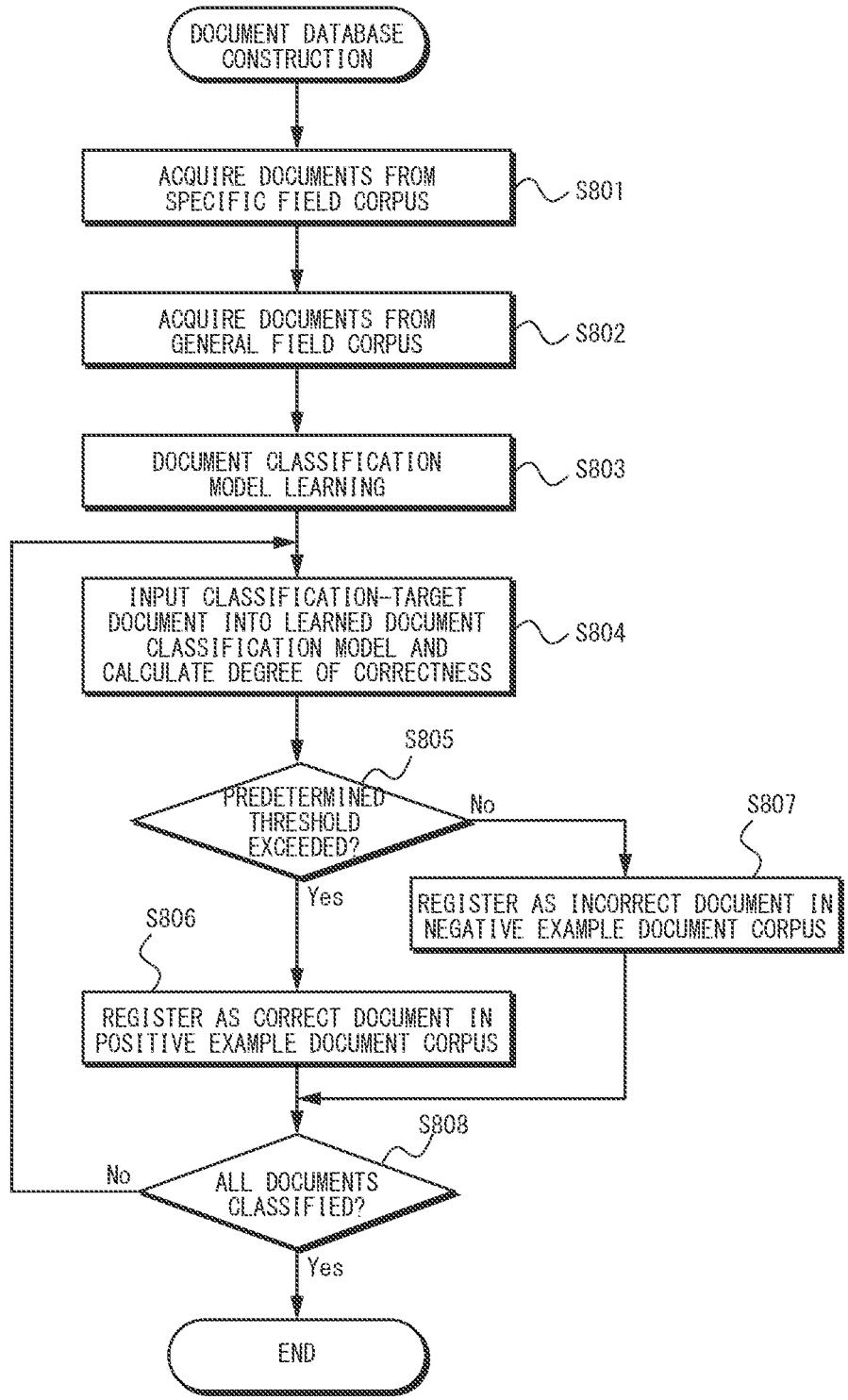
FIG. 8 is a flowchart for illustrating a process for constructing a document database in a document display assistance system according to an embodiment of the present invention.

FIG. 8 is a flowchart for illustrating a process for constructing a document database in a document display assistance system 100 according to an embodiment of the present invention. Such a process may be achieved, for example, by the cloud computer 110 executing a predetermined program under the control of a processor.

As shown in FIG. 8, the document screening unit 710 in the document display assistance system 100 acquires a predetermined number of document groups from the specific field document corpus 720 (S801), and acquires substantially the same number of document groups from the general field document corpus 730 (S802). As described above, the document groups acquired here may be part of the document, such as an abstract. In this way, bias in the learned model may be prevented by making the number of documents acquired from the specific field document corpus 720 substantially the same as the number of documents acquired from the general field document corpus 730.

Next, the document classification model 714, which is prior to learning, performs machine learning for calculating the degree of correctness of a document depending on the appearance frequency of a word in a specific field, based on the respective acquired document groups (S803). In the machine learning, for example, the Bag-of-Words may be used to calculate the appearance frequency of a word in a text sentence and vectorization is performed.

Once the learned model is constructed, the document classification model 714 accepts inputs of documents to be classified and calculates the degree of correctness for the documents (S804). The document input here is part of the document, such as the body text. The document classification model 714 compares the calculated degree of correctness of the document to a predetermined threshold to determine if the degree of correctness of the document exceeds the predetermined threshold (S805).

If the document classification model 714 determines that the degree of correctness exceeds the predetermined threshold (S805, Yes), it registers such document as a correct document in the positive example document corpus 512 (S806). On the other hand, if the document classification model 714 determines that the calculated degree of correctness fails to exceed the predetermined threshold (S805, No), it registers the document as an incorrect document in the negative example document corpus 514 (S807).

The document screening unit 710 then determines whether all the documents to be classified have been classified (S808), and if it determines that there are unclassified documents (S808, No), the process returns to S804 and is repeated until all documents to be classified are classified. On the other hand, if the document screening unit 710 determines that all documents to be classified are classified (S808, Yes), the process for constructing the document database is terminated.

Figure 9:
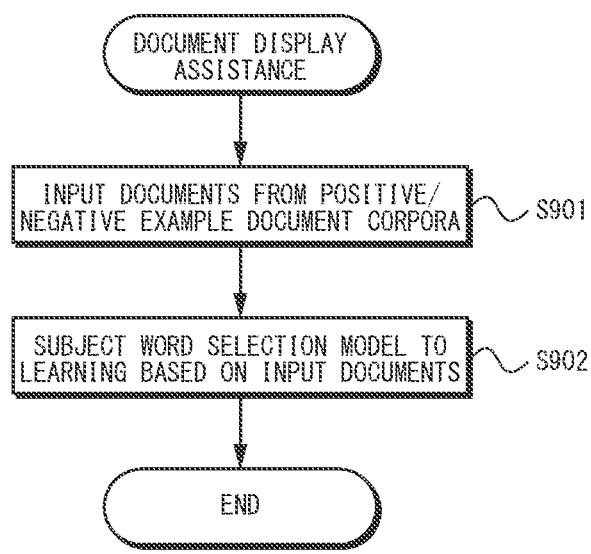
FIG. 9 is a flowchart for illustrating a learning process of a word selection model in a document display assistance system according to an embodiment of the present invention.

FIG. 9 is a flowchart for illustrating a learning process of a word selection model in a document display assistance system 100 according to an embodiment of the present invention. Such process may be achieved, for example, by the cloud computer 110 executing a predetermined program under the control of a processor.

As shown in FIG. 9, the word selection model 236 accepts, as learning data, positive example documents from the positive example document corpus 512 and negative example documents from the negative example document corpus 514 (S901), both corpora being in the document database 510 constructed according to the process described above. The word selection model 236 then performs machine learning on each word in the positive example documents and the negative example documents in order to allow a label for the word to be estimated while taking the context of the word into consideration (S902). The word selection model 236 that has been applied with machine learning as described above can estimate and output labels for input predetermined words.

Figure 10:
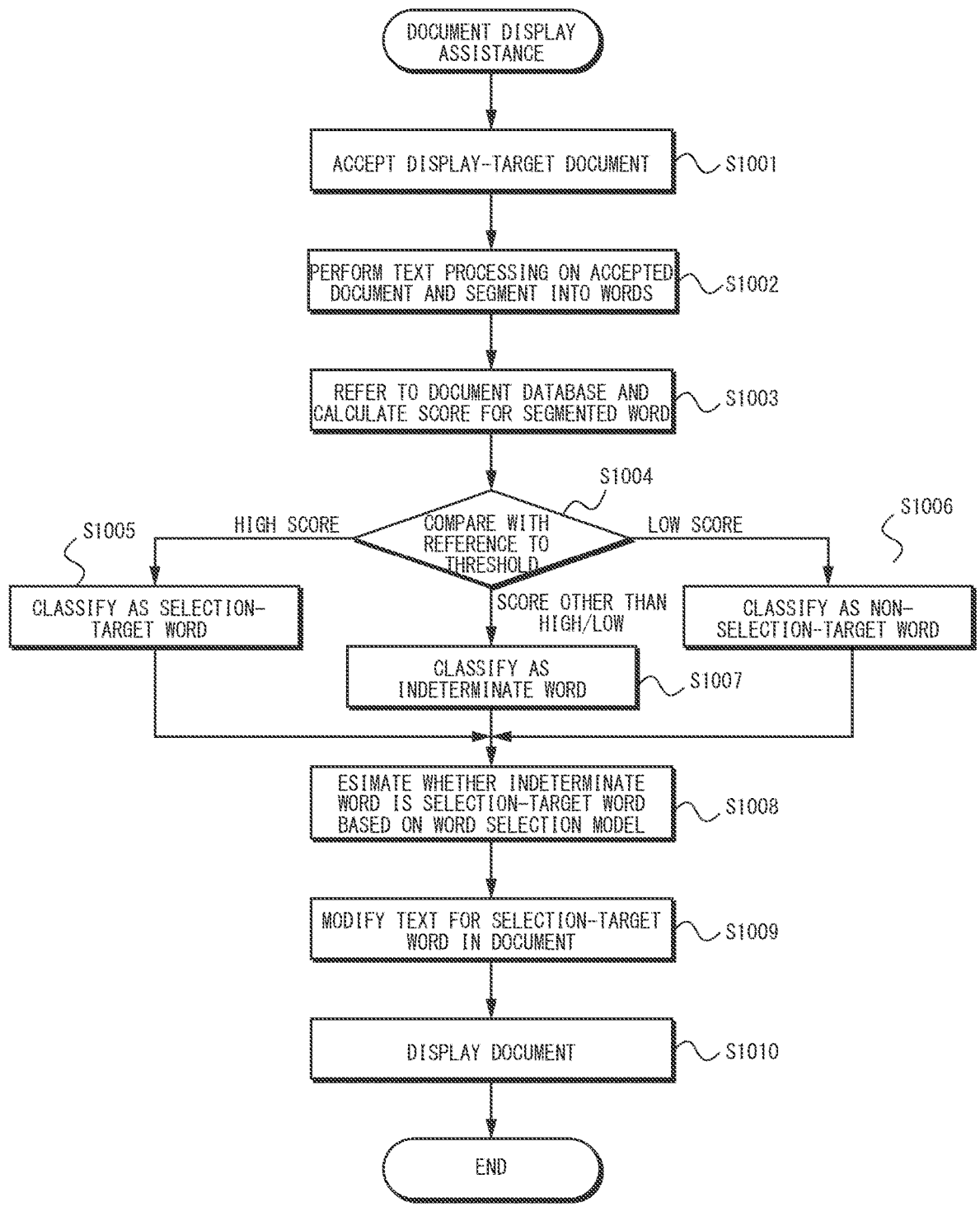
FIG. 10 is a flowchart for illustrating a learning process of a word selection model in a document display assistance system according to an embodiment of the present invention.

FIG. 10 is a flowchart for illustrating a process for document display assistance in a document display assistance system 100 according to an embodiment of the present invention. Such a process may be achieved, for example, by the cloud computer 110 executing a predetermined program under the control of a processor.

More specifically, as shown in FIG. 10, the document acceptance unit 220 accepts, as a display-target document, a document to be visually determined as to whether it has relevance to a specific field (S1001). Next, the text preprocessing unit 232 segments a plurality of words from the text body in the accepted document using, for example, a morphological analysis process (S1002).

Next, the word classification unit 234 refers to the document database 510 for the segmented words and calculates scores based on a predetermined scoring function (S1003). For example, the calculated score is the degree of correctness (e.g., a value between 0 and 100) and the degree of incorrectness (a value between −100 and 0). The word classification unit 234 compares the calculated score to a predetermined threshold (S1004) in order to classify the words. More specifically, the word classification unit 234 classifies the word as a selection-target word if the calculated score (provided that the score is a positive value) for the word exceeds a first threshold (S1005). On the other hand, the word classification unit 234 classifies the word as a non-selection-target word if the calculated score (provided that the score is a negative value) for the word fails to exceed a second threshold (S1006). In addition, the word classification unit 234 classifies the word as an indeterminate word for cases other than the cases above, namely, if the calculated score fails to exceed the first threshold and exceeds the second threshold (S1007).

Subsequently, the word selection model 236 estimates whether the indeterminate word is a selection-target word according to the context of the surroundings of the word, based on the input words (e.g., the selection-target words, the non-selection-target words, and the indeterminate words) (S1008). The word selection model 236 imparts, for example, a label of either a selection-target word or a non-selection-target word to the input word as the result of such estimation.

Once the word selection model 236 performs estimation, the text post-processing unit 240 modifies the text sentence of the accepted document such that the selection-target words are displayed in a visually differentiated manner in the accepted document based on the estimated results output from the word selection model 236 (S1009). As an example, the text post-processing unit 240 generates output data in which character attribute information is added to the document such that the selection-target words are highlighted. The document display unit 250 then displays the document modified based on the output data generated by the text post-processing unit 240 on a user interface.

As described above, according to the embodiment described above, the document display assistance system 100 can estimate, for a document of a specific field to which a user seeks to refer, a word that is deemed significant or relevant in the specific field as a selection-target word using a word selection model 236, and display the estimated selection-target word in a visually differentiated manner.

The above-described respective embodiments are illustrations for describing the present invention, and are not intended to limit the present invention only to these embodiments. The present invention may be implemented in various forms, as long as they do not deviate from the gist of the invention.

For example, the present disclosure has been described by taking the cancer genomic field as an example of the specific field, but the specific field is not limited thereto. In addition, the documents may include not only papers but also reports, tables, electronic medical records, etc.

Further, the above-described document display assistance system 100 is configured to display the selection-target words in a document in a visually differentiated manner, but the configuration is not limited thereto, and the system may be configured, for example, to further utilize the selection-target words. More specifically, the words classified as selection-target words and highlighted in a display-target document by the document display assistance system 100 indicate that they are words that are semantically meaningful in the document. Therefore, the selection-target words may be utilized as meta-information (tags) or keywords in the document.

As an example, the document display assistance system 100 may register a word in a document, which has been classified as a selection-target word by the word selection model 236, in a database as a tag and/or keyword in association with the document. When a user refers to such document, the document display assistance system 100 may provide the user with a preview of the word associated as described above, thereby allowing the user to quickly understand the contents of the document.

As another example, the document display assistance system 100 may have the capability to suggest a search query based on the selection-target words registered in association with the document, and/or the capability to weight the search results.

As a further example, the document display assistance system 100 may have the capability to identify sections, such as sentences, paragraphs, and chapters, of a document in which the selection-target words appear on multiple occasions, and to generate an abstract of such document by performing natural language processing focusing on the identified sections.

As a further example, the document display assistance system 100 may be configured to read out the selection-target words in a document by sound, or the like, in addition to or in place of displaying the selection-target words in a visually differentiated manner.

Further, the steps, actions, or functions in the method disclosed in the present specification may be implemented in parallel or in different order, unless there is no inconsistency in the results. The described steps, actions, and functions are provided as examples only and some of the steps, actions, and functions may be omitted and may be performed as one entity by being combined with each other, and other steps, actions, or functions may be added, to the extent that they do not deviate from the gist of the invention.

In addition, various embodiments are disclosed in the present specification, but specific features (technical matters) in one embodiment may be added to other embodiments with appropriate improvements, or may be replaced with specific features in such other embodiments, and such embodiments are also included in the gist of the present invention.

REFERENCES

100 . . . Document display assistance system
110 . . . Cloud computer
120 . . . Client computer
210 . . . Word database
220 . . . Document acceptance unit
230 . . . Document analysis unit
  232 . . . Text pre-processing unit
  234 . . . Word classification unit
  236 . . . Word selection model
240 . . . Text post-processing unit
250 . . . Document display unit
260 . . . Document processing unit
510 . . . Document database
  512 . . . Positive example document corpus
  524 . . . Negative example document corpus
710 . . . Document screening unit
  712 . . . Document extraction unit
    714 . . . Document classification model
720 . . . Specific field document corpus
730 . . . General field document corpus

The invention claimed is:

1. A document display assistance system, comprising:
a database in which a selection-target word set composed of words to be selected in a document of a specific field and a non-selection-target word set composed of words to not be selected in the document of the specific field are registered; and a processor configured to:
construct a learned word-selection model having been applied with machine learning for estimating a label for a given word, the label indicating at least one of a selection-target word or a non-selection-target word according to a context related to the given word;
accept a display-target document;
segment each of a plurality of words from the accepted display-target document;
classify, based on the database, each of the plurality of words in the accepted display-target document into at least one of a selection-target word, a non-selection-target word, or an indeterminate word;
generate output data by imparting predetermined character attribute information to a predetermined word in the display-target document; and
output the output data,
wherein if a label indicating the selection-target word is estimated for the classified indeterminate word, the processor is configured to classify the indeterminate word into a selection-target word using the learned word-selection model, and
the processor is configured to impart the predetermined character attribute information to the classified selection-target word.

2. The document display assistance system according to claim 1, wherein the processor is configured to, for each of the plurality of words, classify a word, which has failed to be classified into either the selection-target word or the non-selection-target word based on the database, as the indeterminate word.

3. The document display assistance system according to claim 1, further comprising a learned document classification model having been applied with machine learning for calculating a degree of correctness of a document depending on an appearance frequency of a word in the specific field by using a first document group in a specific field document corpus related to the specific field and a second document group in a general field document corpus in a larger field than the specific field as learning data.

4. The document display assistance system according to claim 3, wherein the processor is configured to randomly extract the second document group from the general field document corpus such that a number of documents in the second document group is substantially the same as a number of documents in the first document group.

5. The document display assistance system according to claim 3, wherein the processor is configured to, using the learned document classification model, accept a classification-target document, and estimate whether the document is a correct document or an incorrect document with reference to a predetermined threshold by calculating a degree of correctness of the accepted classification-target document.

6. The document display assistance system according to claim 1, wherein the processor is configured to generate the output data which is configured to display the predetermined word imparted with the predetermined character attribute information in a visually differentiated manner.

7. A document display assistance system, comprising:
a database in which a plurality of documents is registered; and
a processor configured to:
construct a learned word-selection model having been applied with machine learning for estimating a label for a given word, the label indicating at least one of a selection-target word or a non-selection-target word according to a context related to the given word;
accept an input of a display-target document of a specific field;
segment each of a plurality of words from the accepted display-target document;
calculate a predetermined score for each of the plurality of segmented words based on the database and classifies the segmented word into at least one of a selection-target word, a non-selection-target word, or an indeterminate word according to the calculated predetermined score;
generate output data by imparting predetermined character attribute information to a predetermined word in the display-target document; and
output the output data,
wherein if a label indicating the selection-target word is estimated for the classified indeterminate word, the processor is configured to classify the indeterminate word into a selection-target word using the learned word-selection model, and
the processor is configured to impart the predetermined character attribute information to the classified selection-target word.

8. The document display assistance system according to claim 7, wherein the database includes a corpus of positive example documents defined as correct cases, and
if a first score calculated for the given word using the positive example document corpus exceeds a first threshold, the processor is configured to classify the given word into the selection-target word.

9. The document display assistance system according to claim 8, wherein the database further includes a corpus of negative example documents defined as incorrect cases, and
the processor is configured to calculate the first score based on a total number of documents in which the given word appears in the entirety of the positive example documents of the positive example document corpus and the entirety of the negative example documents of the negative example document corpus, with respect to the number of documents in which the given word appears in the entirety of the positive example documents of the positive example document corpus.

10. The document display assistance system according to claim 9, wherein the processor is configured to classify the given word into the non-selection-target word based on a second score depending on a frequency of the document in which the given word appears with respect to the entirety of the positive example documents of the positive example document corpus and the entirety of the negative example documents of the negative example document corpus.

11. The document display assistance system according to claim 10, wherein, if a second score depending on a predetermined inverse document frequency fails to exceed a second threshold based on the entirety of the positive example documents of the positive example document corpus and the entirety of the negative example documents of the negative example document corpus, the processor is configured to classify the given word into the non-selection-target word; or if a second score depending on a predetermined document frequency exceeds a second threshold, the processor is configured to classify the given word into the non-selection-target word.

12. The document display assistance system according to claim 7, further comprising a learned document classification model having been applied with machine learning for calculating a degree of correctness of a document depending on an appearance frequency of a word in the specific field by using a first document group in a specific field document corpus related to the specific field and a second document group in a general field document corpus in a larger field than the specific field as learning data.

13. The document display assistance system according to claim 7, wherein the processor is configured to generate the output data which is configured to display the predetermined word imparted with the predetermined character attribute information in a visually differentiated manner.

14. A document display assistance method for displaying a predetermined word in a display-target document in a visually differentiated manner, comprising:
- registering a selection-target word set composed of words to be selected in a document of a specific field and a non-selection-target word set composed of words to not be selected in the document of the specific field in a database;
- constructing a learned word-selection model having been applied with machine learning for estimating a label for a given word, the label indicating at least one of a selection-target word or a non-selection-target word according to a context of the given word;
- segmenting each of a plurality of words from the display-target document;
- classifying, based on the database, each of the plurality of words in the display-target document into at least one of a selection-target word, a non-selection-target word, or an indeterminate word;
- generating output data by imparting predetermined character attribute information to a predetermined word in the display-target document; and
- outputting the output data,
- wherein if a label indicating the selection-target word is estimated for the classified indeterminate word, the method comprises classifying the indeterminate word into a selection-target word using the learned word-selection model, and
- the generating output data includes imparting the predetermined character attribute information to the classified selection-target word.

15. A document display assistance method for displaying a predetermined word in a display-target document of a specific field in a visually differentiated manner, comprising:
- constructing a learned word-selection model having been applied with machine learning for estimating a label for a given word, the label indicating at least one of a selection-target word or a non-selection-target word according to a context of the given word;
- segmenting each of a plurality of words from the display-target document;
- based on a database in which a plurality of documents is registered, calculating a predetermined score for each of the plurality of segmented words and classifying the segmented word into at least one of a selection-target word, a non-selection-target word, or an indeterminate word according to the calculated predetermined score;
- generating output data by imparting predetermined character attribute information to a predetermined word in the display-target document; and
- outputting the output data,
- wherein if a label indicating the selection-target word is estimated for the classified indeterminate word, the method comprises classifying the indeterminate word into a selection-target word using the learned word-selection model, and
- the generating output data includes imparting the predetermined character attribute information to the classified selection-target word.

16. The document display assistance method according to claim 15, further comprising constructing a learned document classification model having been applied with machine learning for calculating a degree of correctness of a document depending on an appearance frequency of a word in the specific field using a first document group in a specific field document corpus related to the specific field and a second document group in a general field document corpus having a larger field than the specific field as learning data.

17. A product comprising a non-transitory computer-readable medium storing a computer program for achieving a document display assistance method, wherein the program causes, by execution under control of a computing device, the computing device to perform to:
- register a selection-target word set composed of words to be selected in a document of a specific field and a non-selection-target word set composed of words to not be selected in the document of the specific field in a database;
- construct a learned word-selection model having been applied with machine learning for estimating a label for a given word, the label indicating at least one of a selection-target word or a non-selection-target word according to a context of the given word;
- segment each of a plurality of words from a display-target document;
- classify, based on the database, each of the plurality of words in the display-target document into at least one of a selection-target word, a non-selection-target word, or an indeterminate word;
- generate output data by imparting predetermined character attribute information to a predetermined word in the display-target document; and
- output the output data,
- wherein if a label indicating the selection-target word is estimated for the classified indeterminate word, the program causes the computing device to classify the indeterminate word into a selection-target word using the learned word-selection model, and
- wherein the computing device generates the output data by imparting the predetermined character attribute information to the classified selection-target word.

\* \* \* \* \*